United States Patent [19]
Hildenbrand

[11] 3,875,327
[45] Apr. 1, 1975

[54] ELECTRICAL BUSHING HAVING A SPIRAL TAP ASSEMBLY

[75] Inventor: Jerry L. Hildenbrand, Muncie, Ind.

[73] Assignee: Westinghouse Electric Corporation, Pittsburgh, Pa.

[22] Filed: June 6, 1974

[21] Appl. No.: 477,113

[52] U.S. Cl. ............................................. 174/143
[51] Int. Cl. ......................................... H01b 17/28
[58] Field of Search .............. 174/11 BH, 142, 143; 317/260

[56] References Cited
UNITED STATES PATENTS

| | | | |
|---|---|---|---|
| 1,657,249 | 1/1928 | Eby | 174/143 X |
| 2,679,026 | 5/1954 | Frakes | 174/143 X |
| 3,600,502 | 8/1971 | Wagenaar et al. | 174/143 |
| 3,647,938 | 3/1972 | Grimmer | 174/143 |

*Primary Examiner*—Laramie E. Askin
*Attorney, Agent, or Firm*—J. R. Hanway

[57] ABSTRACT

Bushing condenser having a spiral tap assembly wound thereon. A tap layer is spirally wound around the condenser insulation system for more than one turn. A ground layer is interleaved with the tap layer and is also wound around the insulation system. The interleaved layers are of sufficient length to provide the desired tap-to-ground capacitance. A conductive strip is connected to the tap layer and extends around the insulation system for approximately one additional turn beyond the outside ends of the tap and ground layers. Grooves in insulation adjacent to the strip and the ground layer provide access for making electrical connections thereto.

5 Claims, 6 Drawing Figures

3,875,327

ELECTRICAL BUSHING HAVING A SPIRAL TAP ASSEMBLY

BACKGROUND OF THE INVENTION

1. Field of the Invention

This invention relates, in general, to electrical apparatus and, more specifically, to electrical bushings having tapped condenser insulation systems.

2. Description of the Prior Art

Condenser bushings are used in a wide variety of high-voltage termination applications, such as with power transformers and power circuit breakers. Condenser bushings usually have a tap terminal connected to an intermediate condenser element within the condenser system to provide power for operating associated monitoring and control apparatus. The ratio of the capacitance between the tap element and the bushing conductor, and the capacitance between the ground element of the condenser system and the tap element, must be a predetermined quantity to provide the correct voltages to the associated apparatus. The correct capacitance ratio is difficult to achieve because it is difficult to get sufficient capacitance between the tap and ground elements of the condenser system without increasing the size of the bushing and further aggravating structural problems with large bushings.

The bushing disclosed in U.S. Pat. No. 3,600,502, which is assigned to the assignee of this invention, provides a solution to the herebefore mentioned problem. The interleaved capacitance tap disclosed thereby has short connecting cables radially positioned between the tap layers and between the ground layers. When this type of bushing is assembled on a spiral-winder, no significant production problems are encountered. However, when such a bushing is assembled on a higher productivity sheet-winder, it is difficult to make and maintain a good solder joint between the condenser elements and the connecting cables. It is also difficult to punch holes through the wound paper insulation which is located between the condenser elements. Therefore, it is desirable, and it is an object of this invention, to provide a tapped bushing condenser system which does not require connecting cables connected between the condenser elements.

Particular bushing applications require certain specified tap-to-ground capacitances. With conventional interleaved condenser elements, the capacitance provided thereby is changed usually by increasing or decreasing the number of elements connected together. With this arrangement, capacitance values are changed incrementally and intermediate capacitance values are not possible without an adjustment in the size or spacing of the elements. Such adjustments are not easily made without affecting the other bushing components. Therefore, it is also desirable, and it is a further object of this invention, to provide an electrical condenser bushing in which the capacitance of the tap assembly may be easily changed.

SUMMARY OF THE INVENTION

There is disclosed herein a new and useful condenser bushing having a tap portion which is easily constructed and which provides the desired capacitance between the tap element and the ground element. A tap layer of conductive sheet is spirally wound around the condenser insulation system for more than one turn. A ground layer of conductive sheet is also spirally wound around the condenser insulation system and is interleaved with the tap layer. The length of the interleaved portion determines the capacitance between the tap and ground layers. A tap layer extension is connected to the upper end of the tap layer and is wound around the condenser insulation system for approximately one additional turn. Grooves are cut in the insulation system to permit exposure of the ground layer and the tap layer extension for making electrical connections thereto.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
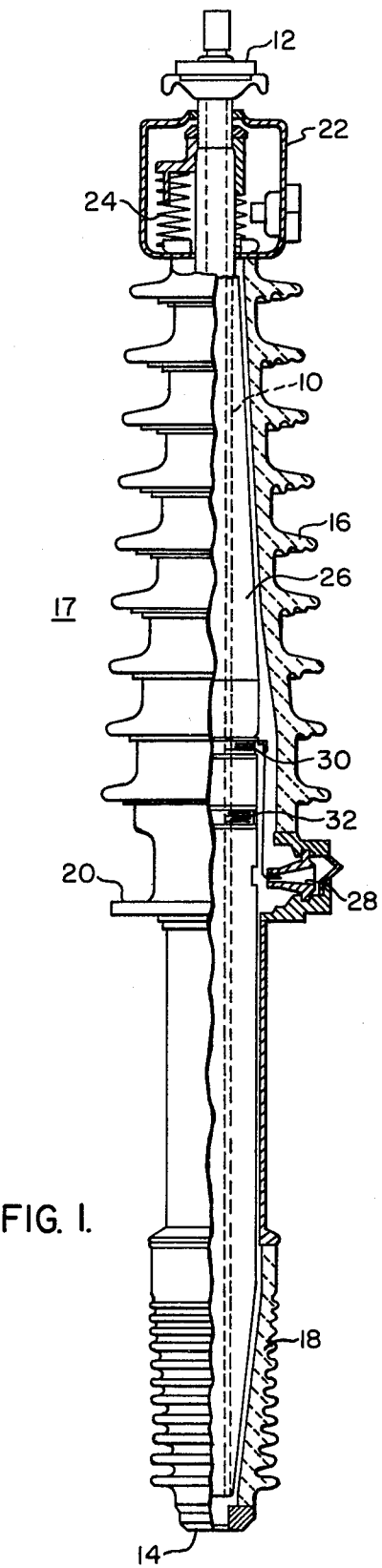
FIG. 1 is a cut-away view of a condenser bushing constructed according to this invention.

Throughout the following description, similar reference characters refer to similar elements or members in all the figures of the drawing.

Referring now to the drawing, and to FIG. 1 in particular, there is shown an electrical condenser bushing constructed according to this invention. The bushing includes the longitudinal conductor 10 which extends between the terminal cap 12 and the bottom terminal 14. A hollow insulating structure 17 comprising the insulators 16 and 18 and the flange member 20 are positioned around the longitudinal conductor 10. The insulators 16 and 18 are normally constructed of porcelain and the flange member 20 provides means for attaching the bushing to the enclosure of the apparatus on which the bushing is mounted. The insulators 16 and 18 and the flange member 20 are compressed between the expansion bowl 22 and the bottom terminal 14 by the spring assembly 24 to maintain an oil-tight seal between the various members of the bushing.

A condenser insulation system 26 is positioned between the longitudinal conductor 10 and the insulating structure 17. The purpose of the condenser insulation system 26 is to grade the electrical stresses on the insulators 16 and 18. The condenser insulation system 26 includes a plurality of conductive elements disposed around the longitudinal conductor 10 and separated by suitable insulating material, such as oil impregnated kraft paper. An intermediate conductive layer is electrically connected to the tap receptacle 28 to provide power for associated monitoring and control apparatus. The power provided thereby is responsive to the potential on the bushing. A tap layer groove 30 is positioned around the condenser insulation system 26 to permit electrical attachment of the tap receptacle 28 to the conductive tap layer of the bushing. The ground layer groove 32 provides access to the ground layer of the bushing condenser insulation system 26 for attachment of this layer to the flange member 20.

Figure 2:
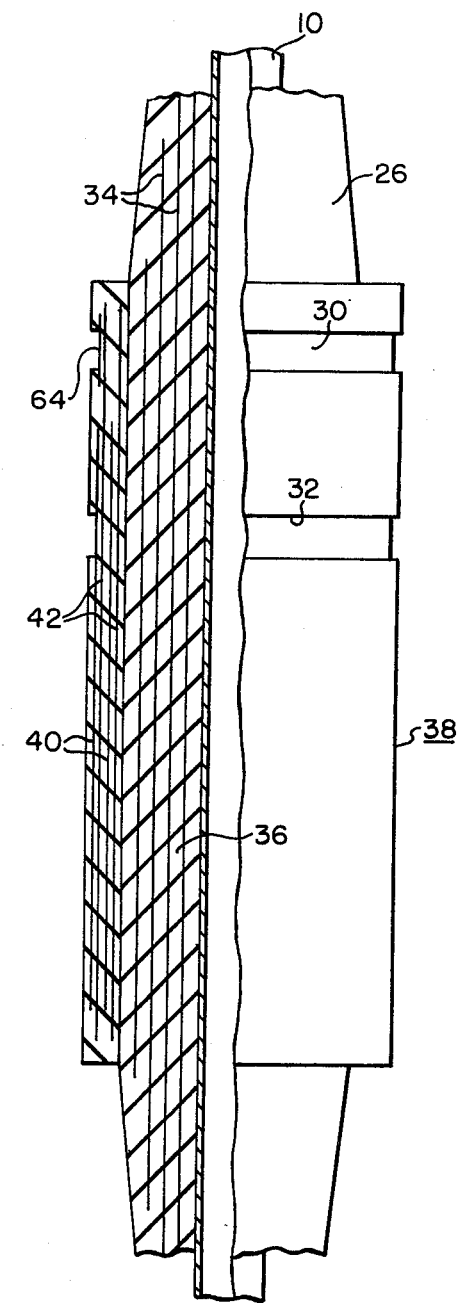
FIG. 2 is a cut-away view of the condenser and tap assembly of the bushing shown in FIG. 1.

FIG. 2 is a cut-away view of the condenser insulaton system 26 shown in FIG. 1. The condenser insulation system 26 includes the conductive layers 34 which are disposed between suitable insulating material 36 to radially and axially grade the potential around the longitudinal conductor 10. A tap assembly 38 is disposed around the outside of the condenser insulation system 26 and, in this specific embodiment, includes a ground layer 40 and a tap layer 42 which are constructed of conductive sheets separated by insulating material. The tap and ground layers are spirally disposed around the condenser insulation system 26 in a manner which will be described in more detail hereinafter. A tap layer extension or groove strip 64 is positioned in the tap groove 30 and is electrically connected to the tap layer 42. Accessibility to the tap layer groove strip 64 and the ground layer 40 is provided by the tap groove 30 and the ground groove 32. These grooves are provided during the construction of the tap assembly 38 by suitably slitting the insulating material which is wrapped around the tap and ground layers.

The ground layer 40 and the tap layer 42 are interleaved with each other as they spiral around the condenser insulation system 26 to increase the capacitance therebetween. Thus, the tap assembly 38, when placed around the condenser insulation system 26, provides a tap layer adjacent to the condenser insulation system 26 and a ground layer on the outside of the tap assembly 38. The relatively high capacitance between the ground layer 40 and the tap layer 42 provides the desired high capacitance between the radial position within the bushing at which the tap voltage is provided and the components of the bushing which are at ground potential.

Figure 3:
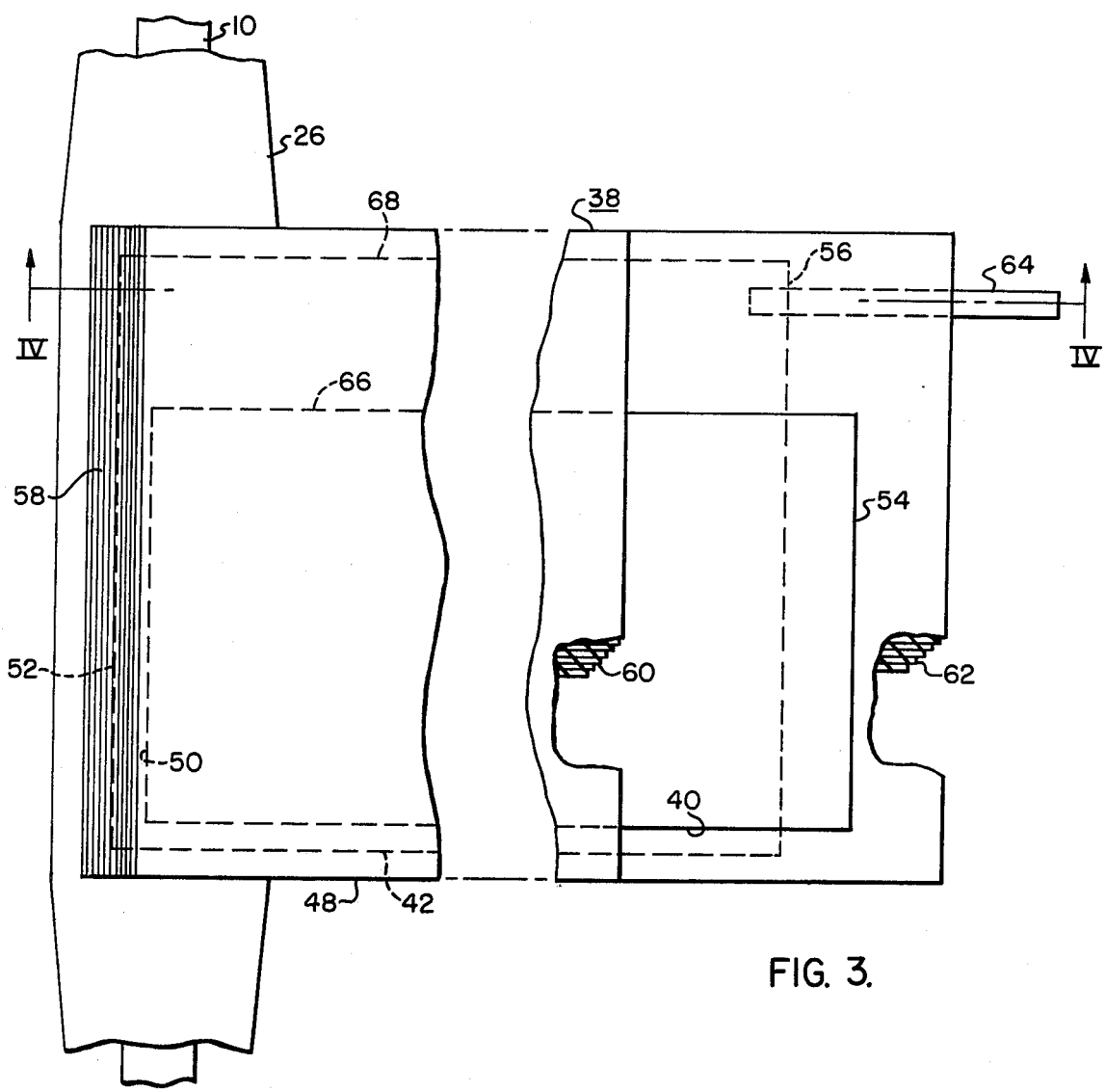
FIG. 3 is a plan view illustrating the method of construction of the tap assembly.
Figure 4:
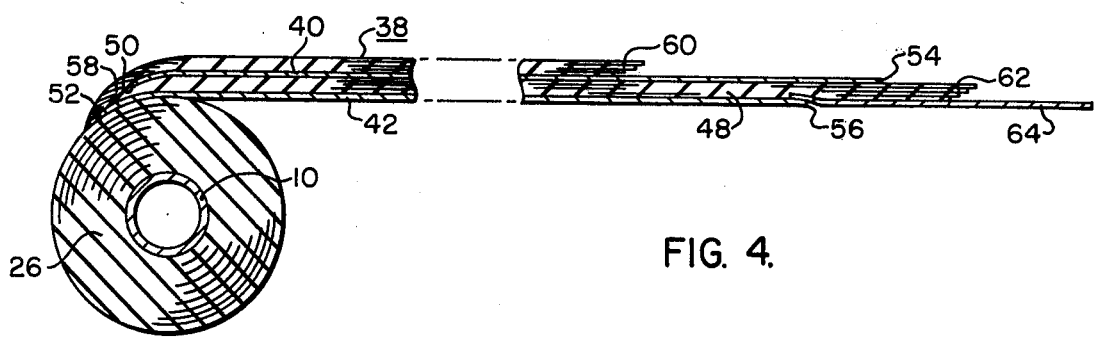
FIG. 4 is a sectional view taken along the line IV—IV of FIG. 3.

FIG. 3 is a partial view of a condenser insulation system 26 and the tap assembly 38 during a step in the construction of the bushing. FIG. 4 is a cross-sectional view taken along the line IV—IV of FIG. 3. Referring to both FIGS. 3 and 4, the tap assembly 38 includes a tap layer 42 of conductive material, such as copper foil. Insulating sheets 48 are positioned above the tap layer 42 in sufficient quantity to provide the required electrical insulation between the various conductive layers of the tap assembly 38. A ground layer 40 is positioned above the tap layer 42 and is of sufficient length to provide the desired capacitance between the tap and ground layers.

The tap layer 42 is positioned within the boundaries of the insulating sheets 48. The ground layer 40 has an inner end 50 which is positioned substantially adjacent to the inner end 52 of the tap layer 42. The ground layer 40 also includes an outer end 54 which extends slightly beyond the end 56 of the tap layer 42. The insulating sheets 48 are staggered at the edges 58, 60 and 62 to prevent abrupt changes in the radial build of the tap assembly 38 when wound around the condenser insulation system 26. A tap layer groove strip 64, which is constructed of a conductive material such as copper foil, is attached to the tap layer 42 and extends beyond the multiple layers of insulating sheets 48. The upper end 66 of the ground layer 40 is positioned below the upper end 68 of the tap layer 42 and below the point of connection of the strip 64 to the tap layer 42.

The tap assembly 38 may be assembled prior to its winding onto the condenser insulation system 26. The relative lengths of the ground and tap layers, of the insulating sheets disposed therearound, and of the general placement of the tap and ground layers with respect to each other may be changed to provide the desired capacitance and dielectric characteristics desired. The assembled tap assembly 38 is positioned on the condenser insulation system 26 which is then rotated in a direction which winds the tap assembly 38 thereon. Without changing the width of the tap and ground layers, or the amount of spacing therebetween, the capacitance between these layers may be varied conveniently by changing the length of the layers. Increasing the length of the interleaved layers increases the capacitance between the layers. In the specific embodiment shown and described herein, the tap and ground layers have a sufficient length to permit their revolution around the insulation system 26 for approximately one and one-half turns.

Figure 5:
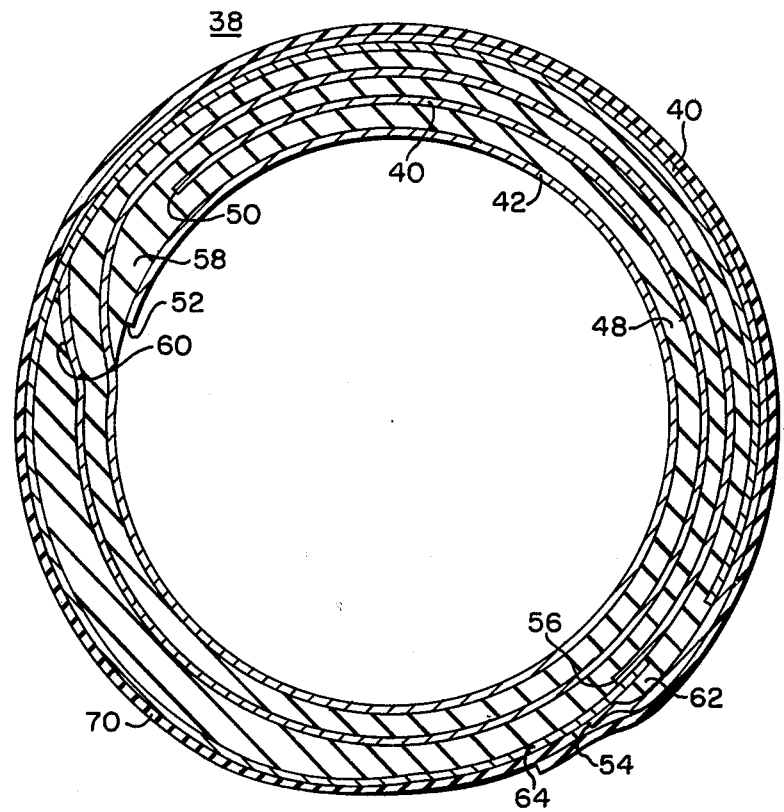
FIG. 5 is a partial cross-sectional view of a spiral tap assembly constructed according to FIGS. 3 and 4; and, FIG. 6 is a cut-away elevational view of the spiral tap assembly shown in FIG. 5.
Figure 6:
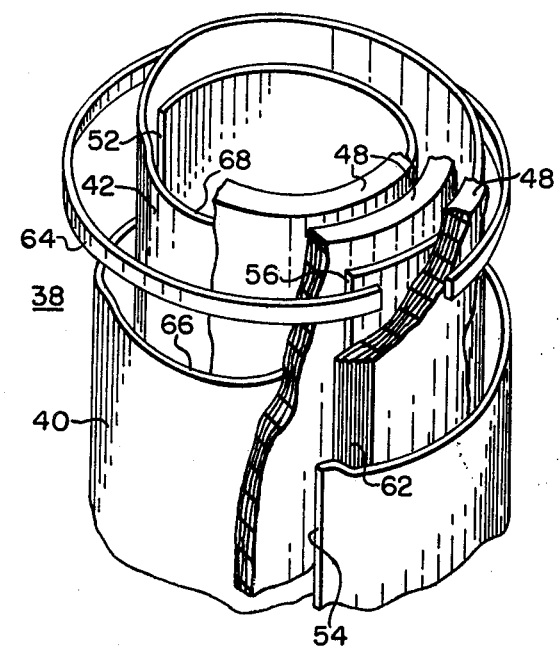

FIG. 5 is a cross-sectional view of a completed tap assembly 38 as it would appear when constructed according to FIGS. 3 and 4. For convenience, the section is arranged in such a manner that the tap layer groove strip 64 and the ground layer 40, which are at different axial positions in the tap assembly 38, are illustrated in the cross-sectional view. FIG. 6 is an isometric view of the tap assembly 38 shown in FIG. 5 with portions of the insulating sheets 48 broken away for clarity.

Referring to both FIGS. 5 and 6, it is shown that the ground layer 40 has a smaller axial dimension than the tap layer 42 and that the top axial end 66 of the ground layer 40 is positioned below the top axial end 68 of the tap layer 42. The tap layer 42 starts at its inner radial end 52 and revolves around the insulation system 26, which is not shown, in a clockwise direction. Although the radius of the first turn of the tap layer 42 does not change significantly, the overall configuration of the tap layer 42 is basically spirally shaped since the outer radial end 56 thereof is at a different radial position than the inner radial end 52. A similar distinction exists for the ground layer 40. Thus, the layers 40 and 42 are spirally disposed around the insulating system 26. After the first turn, the remaining portion of the tap layer 42 extends around the previously wound portion thereof and a portion of the ground layer 40. It is this interleaving of the layers which furnishes the capacitance therebetween. This also provides radially overlapped and overlapping portions of the tap layer 42. The ground layer 40 is also wound simultaneously with the additional portion of the tap layer 42 until the ends 54 and 56 of the layers are positioned around the insulating system 26, at relatively the same circumferential position. An insulating cover 70, which is not illustrated in FIG. 6, is wrapped around the entire tap assembly 38 and contains slits or grooves therein which permit attachment of leads to the electrical members covered by the insulating cover 70.

The tap assembly 38 is wrapped around the condenser insulation system 26 in one convenient manufacturing process. During the first revolution of the condenser insulating system 26, the first turn of the tap layer 42 and substantially the first turn of the ground layer 40 are wound around the condenser system. At the same time, insulation between the first turns of the tap and ground layers and insulation on the outside of the first turn of the ground layer are wrapped around the condenser system. After the first turn, the insulation at the edge 60 begins to taper as the radial position of the tap and ground layers, and the insulation therebetween, moves farther from the center of the bushing. With an additional one-half revolution of the condenser system 26, the remaining one-half turn of the tap layer 42 and the remaining one-half turn of the ground layer 40 are disposed around the condenser system 26, together with the insulation positioned between these portions of the layers 40 and 42. At this position, the insulating sheets 48 taper at the edge 62 since additional insulation around the previous turn of the ground layer 40 is not required. Also at this position, the tap layer groove strip 64 is attached to the tap layer 42 by a suitable process, such as soldering or welding, and an additional revolution of the condenser system 26 wraps the strip 64 around the outside of the insulating material disposed around the tap layer 42. This effectively brings the electrical potential of the tap layer 42 to the outside of the thick insulating material comprising the multiple insulating sheets 48. This is advantageous since it makes it unnecessary to cut through this thick insulation to expose the tap layer 42 for making an electrical connection thereto. In addition, it would be impractical to continue the tap layer 42 around the ground layer 40 for an additional turn since the capacitance of the assembly would be changed and since it is a necessity for proper distribution of the voltage stresses that the center portion of the outside tap assembly be surrounded by a layer at ground potential.

The novel arrangement disclosed herein permits the construction of a condenser bushing having a tapped condenser element with sufficient capacitance between the tapped element and the grounded element. The tap assembly is provided conveniently due to the particular constructional arrangement disclosed herein. Since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. An electrical bushing comprising:
   a longitudinal conductor;
   terminal means located at each end of the longitudinal conductor for connecting associated electrical leads to the longitudinal conductor;
   a hollow insulating structure disposed between each terminal means and around the longitudinal conductor;
   a stress grading condenser system disposed around the longitudinal conductor;
   a tap layer comprising a conductive sheet spirally wound around the condenser system for more than one turn, thereby providing radially overlapped and overlapping portions of the tap layer, said tap layer having top and bottom axial ends and inside and outside radial ends;
   a ground layer comprising a conductive sheet spirally wrapped around the condenser system for more than one turn, with a portion of the ground layer located radially between the overlapped and overlapping portions of the tap layer, said ground layer having top and bottom axial ends and inside and outside radial ends, with the top axial end of the tap layer extending above the top axial end of the ground layer;
   a tap layer extension which is connected to the outside radial end of the tap layer and which is wrapped around the longitudinal conductor above the top axial end of the ground layer; and,
   insulating members separating the tap and ground layers.

2. The electrical bushing of claim 1 wherein the hollow insulating structure includes a flange for attaching the bushing to an electrical apparatus housing, said flange being electrically connected to the ground layer, and wherein the tap layer extension is electrically connected to a terminal for providing an accessible voltage which is responsive to the potential between the longitudinal conductor and the ground layer.

3. The electrical bushing of claim 1 wherein the inside radial end of the ground layer is positioned relatively near to the same circumferential position occupied by the inside radial end of the tap layer.

4. The electrical bushing of claim 1 wherein the outside radial end of the ground layer is positioned relatively near to the same circumferential position occupied by the outside radial end of the tap layer.

5. The electrical bushing of claim 1 wherein the tap layer extension includes a conductive strip attached to the tap layer and wrapped for approximately one turn around the longitudinal conductor.

* * * * *